(12) United States Patent
Camenares et al.

(10) Patent No.: US 11,676,604 B2
(45) Date of Patent: Jun. 13, 2023

(54) NATURAL LANGUAGE BASED ELECTRONIC COMMUNICATION PROFILE SYSTEM

(71) Applicant: Capital One Services, LLC, McLean, VA (US)

(72) Inventors: Christopher Camenares, Falls Church, VA (US); Joseph Boayue, Reston, VA (US); Lee Adcock, Midlothian, VA (US); Ana Cruz, Arlington, VA (US); Nahid Farhady Ghalaty, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 337 days.

(21) Appl. No.: 16/895,923

(22) Filed: Jun. 8, 2020

(65) Prior Publication Data

US 2021/0383810 A1    Dec. 9, 2021

(51) Int. Cl.
| | | |
|---|---|---|
| *G06F 40/20* | (2020.01) | |
| *G10L 15/26* | (2006.01) | |
| *G10L 15/18* | (2013.01) | |
| *G06F 40/289* | (2020.01) | |
| *G06F 21/30* | (2013.01) | |
| *G06F 21/31* | (2013.01) | |
| *G06F 40/253* | (2020.01) | |
| *G10L 17/02* | (2013.01) | |

(52) U.S. Cl.
CPC ........... *G10L 15/26* (2013.01); *G06F 40/289* (2020.01); *G10L 15/1822* (2013.01); *G06F 21/30* (2013.01); *G06F 21/316* (2013.01); *G06F 40/253* (2020.01); *G10L 17/02* (2013.01)

(58) Field of Classification Search
None
See application file for complete search history.

(56) References Cited

U.S. PATENT DOCUMENTS

| | | | |
|---|---|---|---|
| 6,490,560 B1 * | 12/2002 | Ramaswamy | .......... G10L 17/10 704/250 |
| 8,645,825 B1 | 2/2014 | Cornea et al. | |
| 8,868,592 B1 | 10/2014 | Weininger et al. | |
| 9,305,092 B1 | 4/2016 | Finkelstein et al. | |
| 9,626,961 B2 * | 4/2017 | Lyman | .................... G06F 40/20 |
| 9,686,275 B2 * | 6/2017 | Chari | .................. H04L 63/0861 |
| 9,747,275 B1 * | 8/2017 | Barsness | ............... H04W 4/025 |

(Continued)

*Primary Examiner* — Richard Z Zhu
(74) *Attorney, Agent, or Firm* — Perkins Coie LLP

(57) ABSTRACT

Systems, methods, and computer-readable storage media for generating a quantifiable communication profile of a participant, then using that communication profile to identify fake media and/or verify media as authentic. An exemplary system can receive communications in which a participant was one of the parties communicating, perform natural language processing and statistical analyses on the received communications, and generate a participant communication profile which details how the participant communicates and prefers to be communicated with. The system can also receive media purported to be from the participant, perform natural language processing on the purported media, compare the syntax of the purported media to the participant's communication profile, and identify, based on word usage, the media as a fake.

20 Claims, 5 Drawing Sheets

(56) References Cited

U.S. PATENT DOCUMENTS

| | | | |
|---|---|---|---|
| 2014/0237570 A1* | 8/2014 | Shishkov | G06F 21/316 |
| | | | 726/7 |
| 2016/0132669 A1* | 5/2016 | Pathan | G06F 21/32 |
| | | | 726/19 |
| 2018/0342251 A1* | 11/2018 | Cohen | G06V 40/70 |
| 2019/0188251 A1 | 6/2019 | Liu et al. | |
| 2020/0193051 A1* | 6/2020 | Van Antwerp | G06N 20/00 |
| 2021/0073255 A1* | 3/2021 | Trillo Vargas | G06N 20/00 |

* cited by examiner

NATURAL LANGUAGE BASED ELECTRONIC COMMUNICATION PROFILE SYSTEM

BACKGROUND

1. Technical Field

The present disclosure relates to quantifying how individuals communicate, and more specifically to generating a profile of an individual's communication patterns based on natural language processing and statistical analysis of the individual's previous communications.

2. Introduction

Natural language processing is the use of computer processors to receive and analyze text. The processors generally receive binary versions of words, then use pattern recognition on the binary versions to identify known verbs, nouns, adjectives, adverbs, and other parts of speech within the received text. Patterns within text processed by the processor can then be used for additional purposes.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media a technical solution to the technical problem described. A method for performing the concepts disclosed herein can include receiving, from a database of stored communications, a plurality of communications in which a user was one of the parties communicating; performing, via a processor on each communication within the plurality of communications, natural language processing, the natural language processing resulting in communication data generated by the user; executing, via the processor, a statistical analysis on the communication data, the statistical analysis comprising at least one regression, resulting in statistical communication data of the user; generating, via the processor and using the statistical communication data of the user, a communication profile of the user, the communication profile comprising a data structure storing a user identifier associated with a personalized linguistic syntax of the user and the statistical communication data of the user; receiving media containing audio purported to be from the user; performing, via the processor, natural language processing on the audio purported to be from the user, resulting in analyzed purported audio; comparing, via the processor, a syntax of the analyzed purported audio to the personalized linguistic syntax stored within the communication profile of the user, resulting in a syntax similarity score; comparing, via the processor, words used within the analyzed purported audio with the statistical communication data of the user, resulting in a word usage similarity score; and identifying, via the processor and based on the syntax similarity score and the word usage similarity score, the media as a fake.

A system configured to perform the concepts disclosed herein can include an input device; a display device; a processor; a non-transitory computer-readable storage medium having instructions stored which, when executed by the processor, cause the processor to perform operations comprising: receiving, from the input device, a communication from a user, the communication comprising one of an email, an audio clip, or a SMS (Short Message Service) message; performing natural language processing on the communication, resulting in a parsed communication having a data structure comprising: (1) the communication, and (2) identification of at least one of nouns, verbs, pronouns, emoticons, or phrases within the communication; identifying, using the at least one of nouns, pronouns, emoticons, or phrases stored within the data structure of the parsed communication, a context for the communication, wherein the context is identified by the processor comparing the at least one of nouns, pronouns, emoticons, or phrases stored in the data structure to at least one of nouns, pronouns, emoticons, or phrases associated with predetermined contexts and, upon identifying a similar usage of the parsed communication and the predetermined contexts, identifying the context based on the similar usage; tagging the parsed communication with a contextual tag based on the context, resulting in a tagged parsed communication; transmitting the tagged parsed communication to a database; receiving, from a server which is in electronic communication with the database, a communication profile of the user, wherein the communication profile is based at least in part on the tagged parsed communication; and displaying, via the display device, the communication profile.

A non-transitory computer-readable storage medium configured as disclosed herein can have instructions stored which, when executed by a computing device, cause the computing device to perform operations which include: receiving, from user device, a tagged communication in which a user was communicating; adding the tagged communication to a database of communications, the database of communications storing a plurality of tagged communications from the user; performing, on each tagged communication within the plurality of tagged communications, natural language processing, the natural language processing resulting in user communication data; executing a regression analysis on the user communication data, resulting in weights identifying how the user communicates; generating, using the weights identifying how the user communicates, a quantitative profile of how the user communicates; and transmitting the quantitative profile of how the user communicates to the user device.

DETAILED DESCRIPTION

Figure 1:
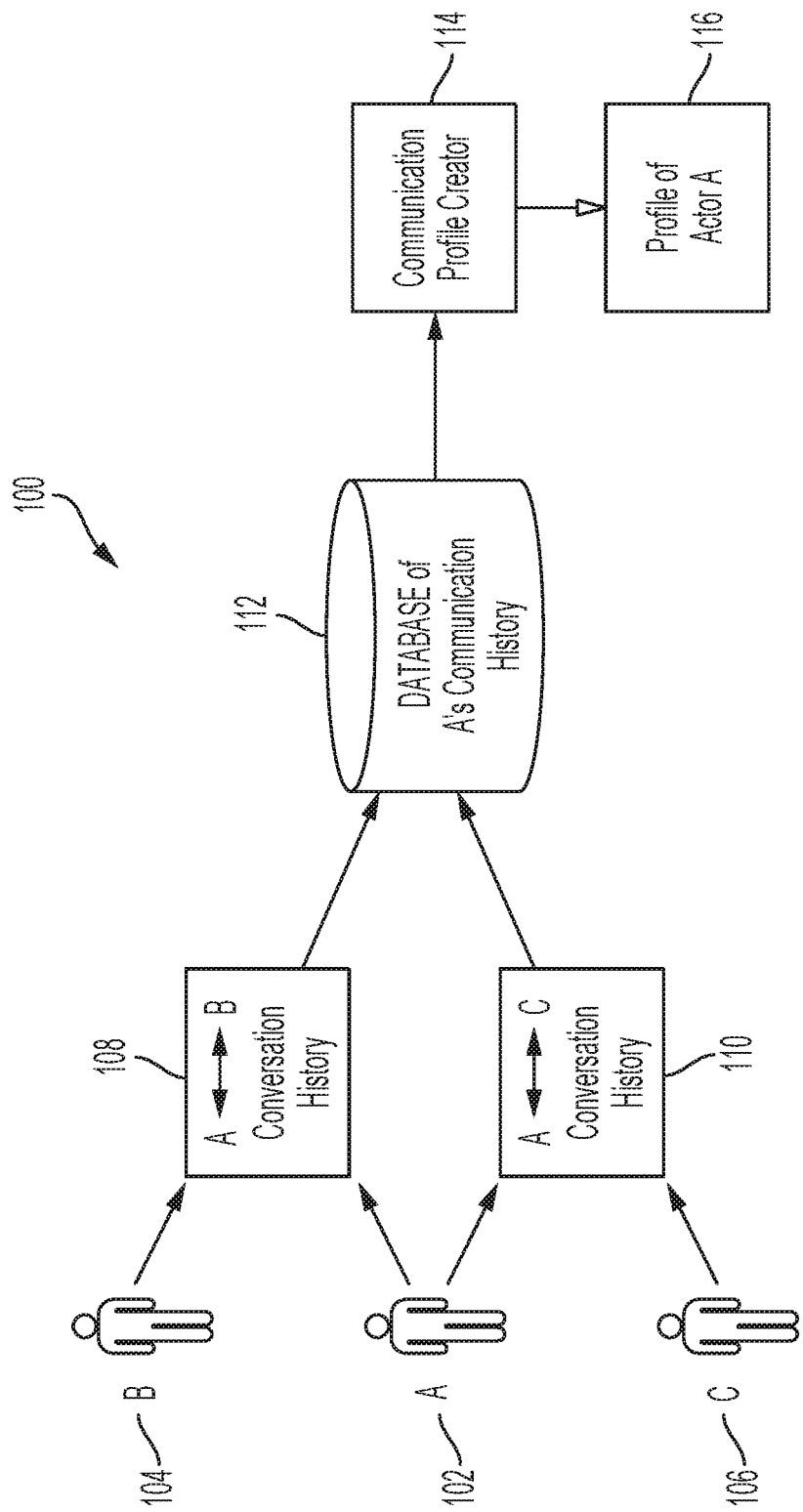
FIG. 1 illustrates an exemplary system view of generating a communication profile for a participant.

Various embodiments of the disclosure are described in detail below. While specific implementations are described, it should be understood that this is done for illustration purposes only. Other components and configurations may be used without parting from the spirit and scope of the disclosure.

Disclosed are systems, methods, and computer-readable storage media for processing electronic communications and generating a quantifiable, fact-based communication profile. The communication profile can identify patterns or behavior in communications. These patterns or behaviors may be used to verify communications as authentic.

Generating the quantifiable, fact-based communication profile requires access to electronic communications records. Electronic communications can be stored in a database and/or communicated directly to the system (such as a server) where the electronic communications are being processed. Examples of non-limiting types of electronic communications which can be processed by the system include emails, text (SMS) messages, voicemails, instant messages, voicemails and/or audio recordings of voice communications (including conference calls). The system analyzes the electronic communications received, and uses the analyzed communications to generate a communication profile. The information for each participant in the communication can be used to generate or update a corresponding communication profile for the respective participant.

Analysis of the communications as disclosed herein can occur via a multi-step process. The processes described herein can occur sequentially or in parallel, depending on specific configurations and circumstances. In some circumstances, all of the communications can be converted to a common format, such as text-based communications. For example, if necessary, the system can execute speech-to-text algorithms on voicemails, conference call recordings, or other audio communications (including audio portions of a video recording), thereby transforming the communication from a first format (audio/video) to a second format electronic (text). In some cases where speech-to-text processing occurs, the system can also record audio pitches/frequency of the speaker's voice, and record the pitch/frequency information within the resulting electronic transcript. The resulting electronic transcripts can then be processed along with the other text-based communications received from the database or received directly from input devices (such as computers, servers, microphones, etc.).

Once received communications are in a text-based format the system can, using a processor, execute natural language processing on the received communications. The natural language processing can parse each individual communication into aspects such as nouns, verbs, pronouns, emojis, etc., while identifying aspects such as sentence structure, a cadence/prosody of the communicator (which can be interpreted using timestamps within the communication), syntax, and/or other aspects of the structure of the communication. Vocabulary words identified in portions of the parsed communication can be used by the processor to identify a topic of a portion or an entirety of the communication. For example, multiple references to "ketchup" and "hamburger" within a communication can trigger the processor to identify the topic of the communication as "dinner." In some configurations, the identification of the topic can be determined using, together with the vocabulary, other aspects of the communication such as time of day of the communication, the day of week of the communication, other parties (recipients) associated with the communication, etc. In addition, the system can create a database record for a portion or an entirety of the parsed communication.

Once the system has parsed the communications using natural language processing, the system can conduct a statistical analysis of the parsed communications. The statistical analysis identifies patterns within the parsed communications, such as the repetition of certain words, grammar, syntax, sentence structure, etc. The statistical analysis can also draw conclusions based on how the participant responds to received communications by reviewing parsed communications received and the participant's response to those communications. In doing so, the statistical analysis can evaluate a "tone" of the communication. For example, the tone of a communication could be ranked neutral, friendly, hostile, ambivalent, etc.

Preferably, the statistical analysis can use data about the communications (such as metadata), to identify patterns about when/how the participant communicates. The statistical analysis can identify, for example, based on the participant's responses to the parsed communications, communication partners where the participant is more/less likely to respond in a timely manner; topics which the participant prefers/dislikes; topics in which the participant may be an expert, time of day in which the participant best responds (or doesn't respond at all); day of the week in which the participant best responds (or doesn't respond at all); typical speed of response based on other party, topic, time of day, etc.; common sentence structure/topics/parties where the participant is unlikely to respond.

Moreover, such identification of patterns can rely on the use of regressions, identifying from past data how the participant will likely respond in the future based on a given set of circumstances. In using regressions, the system can self-select the variables within the regression used based on whether there are sufficient examples of the variable within the communications received to be statistically significant. For example, if a potential variable has only appeared twice in the history of the participant's communications, that variable may be excluded from the regression portion of the statistical analysis, whereas when there are many instances where the potential variable has appeared in the participant's communication history, the system can execute the regression using the variable as a regression input.

Based on the statistical analysis, the system can generate a communication profile for the participant. The communication profile can contain aspects of how the participant communicates and prefers to be communicated with, as identified by the statistical analysis and/or the natural language processing. Example aspects of the participant's communication preferences contained within the communication profile can include preferences (positive and/or negative) regarding topics; sentence structure; syntax; grammar; cadence/prosody; words per minute; graphics/emoji usage; and/or type/medium of communication, as well as historical rates of response for a given time of day, topic, day of week, communication partner, type/medium of communication, and/or context.

Using the communication profile, the system can also be used to verify content purporting to be from the participant, or to identify falsified content purported to be from the participant. For example, if a video purported to be of a participant is received, the system can extract the audio from the video, perform natural language processing on the audio, perform a statistical analysis on the parsed transcript resulting from the natural language processing, and compare the resulting statistics and parsed transcript to the participant's communication profile. If the comparison shows that the purported video matches the communication profile of the participant, or is within a predetermined threshold range of data within the communication profile, the system can identify the video as authentic. Likewise, if the resulting statistics and parsed transcript are outside a predetermined threshold range of the data contained within the communication profile, the system can identify the video as fraudulent. In this manner, the communication profile generated can be used to identify "deep fake" videos, fraudulent audio clips, etc. In some cases, the system can compare the word usage (vocabulary) or syntax of the participant as defined in the communication profile with word usage or syntax in the purported media, and based on the similarity generate a similarity score. If the similarity score is below a predefined threshold, the media can be rejected as fraudulent.

These variations and others shall be further described herein as the various embodiments are set forth. The disclosure now turns to FIG. 1. FIG. 1 illustrates an exemplary system view of generating a communication profile for a participant 102. In this example 100, the participant 102 has had communications with participants B 104 and C 106. The respective communication histories 108, 110 are stored in a database 112 storing participant A's 102 communication history. In some configurations, the database 112 can store communications from other participants 104, 106 as well, whereas in other configurations the database 112 can be exclusive to the participant 102 in question. The database 112 stores the communication histories of participant A 102 from the communications 108, 110, and can also include communication histories of other participants 104, 106.

In some cases, the communications stored in the database 112 can be entire, unprocessed communications (such as the original emails, texts, audio, etc.), whereas in other cases the database 112 can store only processed communications. For example, the database 112 can store only parsed communications which have undergone natural language processing, or which have been previously divided into segments based on context, topic, speaker, time of day, etc.

The stored communications associated with participant A 102 are forwarded from the database 112 to a communication profile creator 114. The communication profile creator 114 can be, for example, a computer system (such as a server, desktop computer, laptop, smartphone, etc.) with a processor which executes communication profile generation code. In some cases, the computer system with the communication profile creator 114 can also contain the database 112, whereas in other configurations the database 112 and the computer system can be separate systems. The communication profile creator 114 uses the stored communications received from the database 112, executes natural language processing (if not previously done before storage in the database 112) and/or a statistical analysis on those communications, then generates a profile 116 of actor A 102 based on the communications, the natural language processing results, and/or the statistical analysis, where the profile provides quantifiable data about how actor A 102 communicates and prefers to be communicated with.

Figure 2:
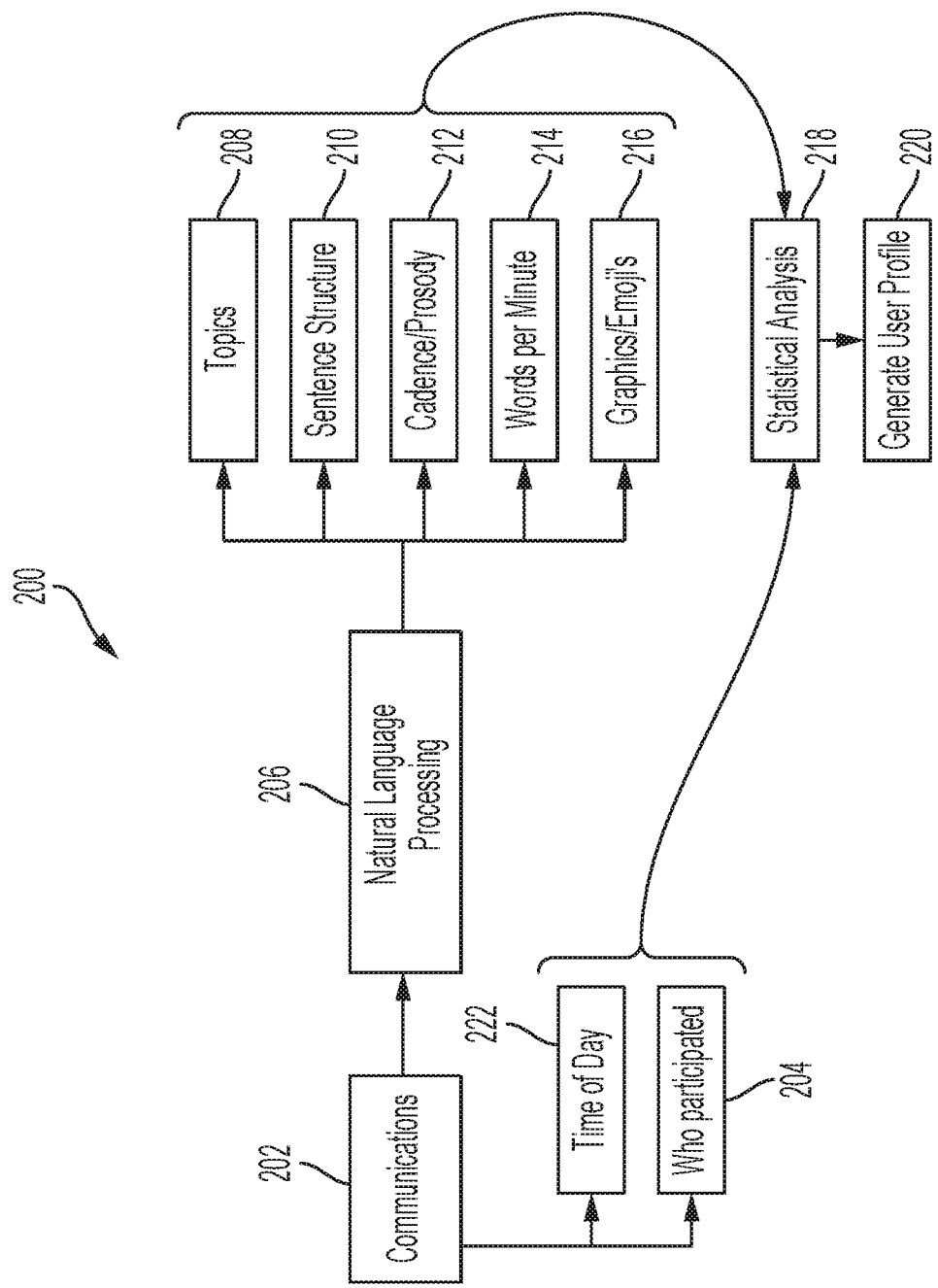
FIG. 2 illustrates an exemplary processing view of generating a communication profile for a participant.

FIG. 2 illustrates an exemplary processing view 200 of generating a communication profile for a participant. With respect to FIG. 1, these are steps which occur within the communication profile creator 114. Here, the communications 202 are received, which (beyond the communication itself) can include data about the time of day 222 of the communication, who participated 204 in the communication, day of week, if the communication was voluntary or mandatory, if others were required to participate in other similar communications, if the communication is a regular/periodic communication, and/or other data about the communication. The communications themselves (e.g., an electronic text transcript of the communication) are processed using natural language algorithms 206, which can parse the communication into aspects such as nouns, verbs, pronouns, etc., identify topics 208, sentence structure 210, cadence/prosody 212 (time stamps may be required), words per minute 214 (again, timestamps may be required), use of graphics/emojis, and/or generate segments of the communication based on one or more of these aspects.

The natural language processing results in parsed communications or parsed communication segments, which are then further processed using statistical analysis 218 together with the original communications, and more particularly, using the data 222, 204 ("metadata") associated with the original communications. This data can then be stored and recorded within a profile database record of associations based on topic, date, or any other quantifiable data parsed from the communications. An example record could include, for example: participant name, the date/time when the communication occurred, the cadence of the user (e.g., words per minute), the topic associated with the communication, top five most common words used by the participant, words which proceeded the communication, sentence length, etc. In this way, the system can identify patterns of behavior within the participant's communication history. Then, using the patterns identified by the statistical analysis 218, the system can generate a participant communication profile 220. In some configurations, the generation of the participant communication profile can rely on, in addition to the statistics from the statistical analysis 218, aspects of the parsed communications resulting from the natural language processing 206 and/or the metadata 222, 204 of the original communications.

Figure 3:
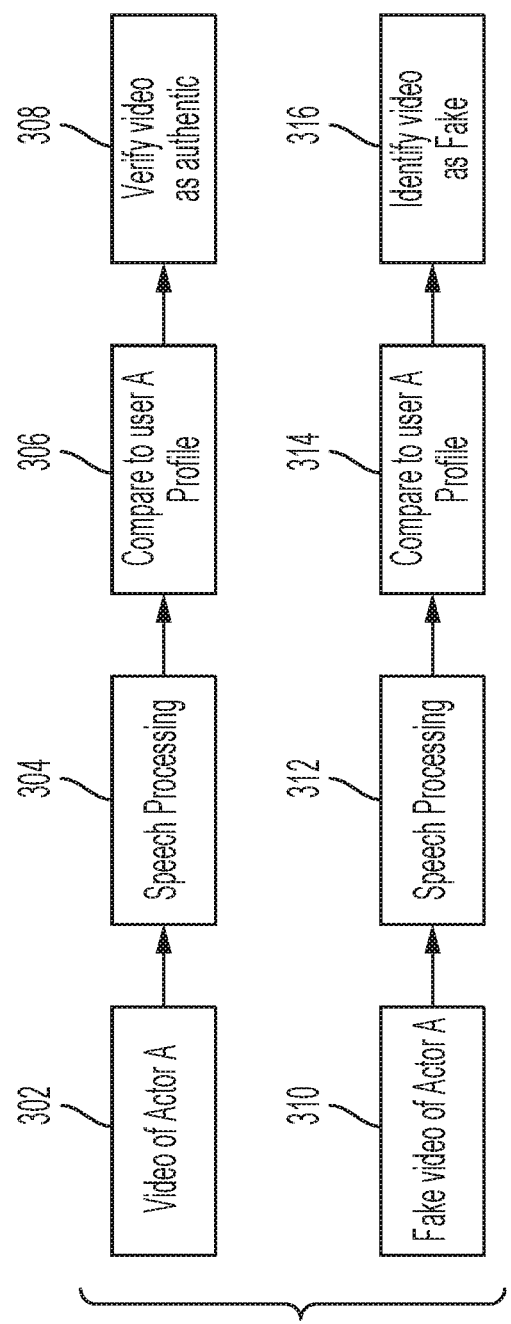
FIG. 3 illustrates examples of verifying a video as authentic or fake.

FIG. 3 illustrates examples of verifying a video as authentic or fake. In the first example, the system receives a video of actor A 302, performs speech processing 304 on the video (which can include speech-to-text processing, natural language processing, and/or statistical analysis), and compares the results to the communication profile of participant A 306. When the comparison reveals that the patterns of communication exhibited within video A 302 match those defined within the communication profile of participant A, or are within a threshold range of those patterns of communication defined within the communication profile, the system identifies the video as authentic 308.

However, in the second example, the system receives a fake video of actor A 310. Here, actor A is purported to have communicated in some way that was fabricated. The system again performs speech processing 312 and compares the results to the profile of participant A 314. However, because the patterns of communication exhibited by the participant in the fake video do not match (or are within a predetermined range of) the patterns of communication identified in participant A's communication profile, the system identifies the video as fake 316. An example range for sentence length could be generated using patterns of sentence length by the participant, where if the sentence length for a communication is above or below two standard deviations, the communication could be flagged as possibly fake. An example range based on word usage could be generated based on a baseline set of words which the participant uses frequently. If those words are not used sufficiently (e.g., less than fifty percent the normal amount, adjusted to communication length), the communication could be flagged as possibly fraudulent.

Figure 4:
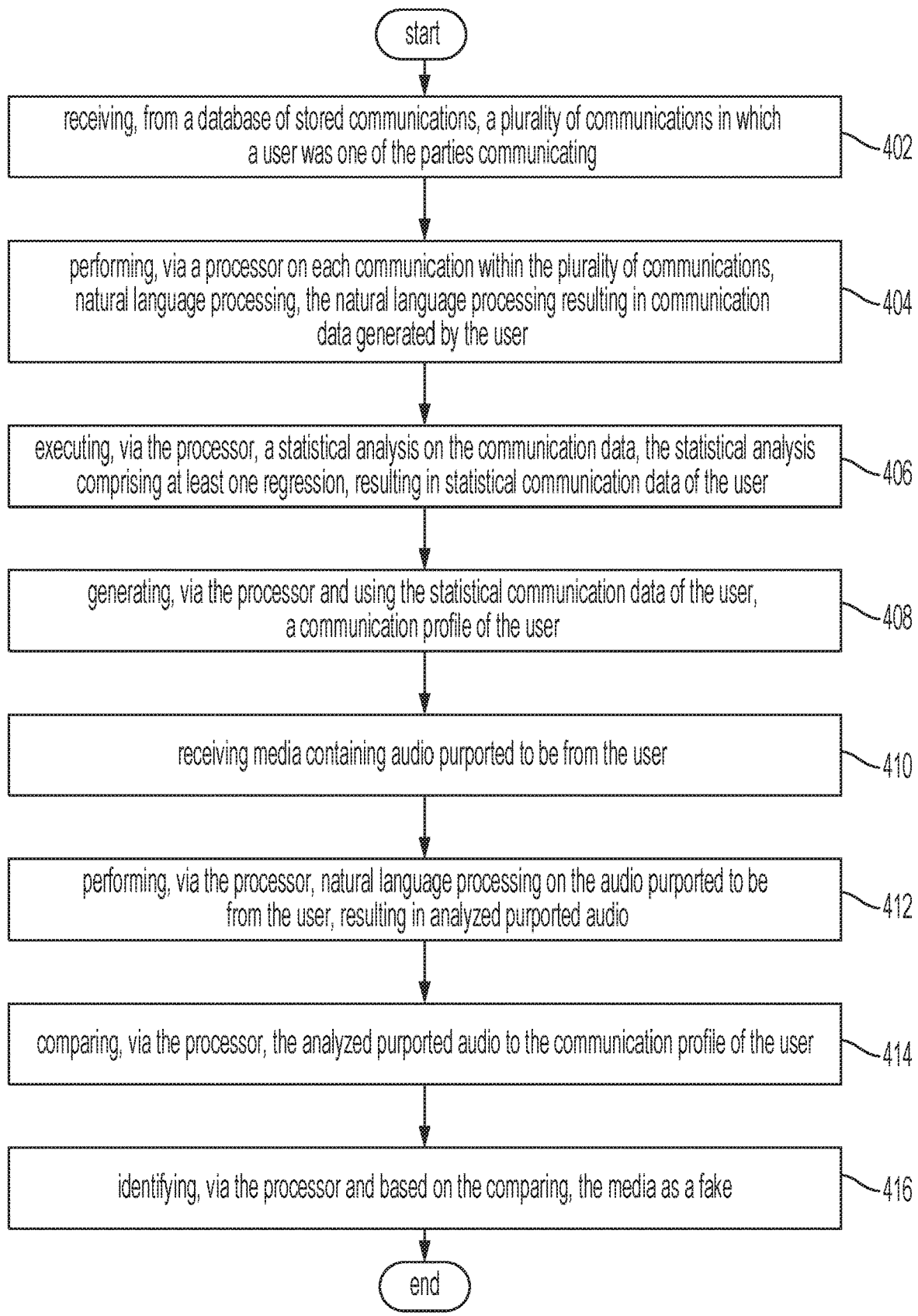
FIG. 4 illustrates an example method embodiment.

FIG. 4 illustrates an example method embodiment. The steps outlined herein are exemplary and can be implemented in any combination thereof, including combinations that exclude, add, or modify certain steps. As illustrated, a system (such as a server or other computing device)

receives, from a database of stored communications, a plurality of communications in which a participant was one of the parties communicating (402). The system performs, via a processor on each communication within the plurality of communications, natural language processing, the natural language processing resulting in communication data generated by the participant (404). The processor can be part of the server or other computing device executing the illustrated method.

The system then executes, via the processor, a statistical analysis on the communication data, the statistical analysis comprising at least one regression, resulting in statistical communication data of the participant (406), and generates, via the processor and using the statistical communication data of the participant, a communication profile of the participant, the communication profile comprising a data structure storing a participant identifier associated with a personalized linguistic syntax of the participant and the statistical communication data of the participant (408). The system receives media containing audio purported to be from the participant (410) and performs, via the processor, natural language processing on the audio purported to be from the participant, resulting in analyzed purported audio (412). The system then compares, via the processor, a syntax of the analyzed purported audio to the personalized linguistic syntax stored within the communication profile of the participant, resulting in a syntax similarity score (414). In some cases, the syntax similarity score can be formed using multiple "sub-scores" related to word choices, cadence, sentence length, and other known patterns associated with the user. These sub-scores can then be weighted, averaged, and/or otherwise combined to form the syntax score. If a sub-score results in the communication being possibly fraudulent, this can also influence the syntax score. The system also compares, via the processor, words used within the analyzed purported audio with the statistical communication data of the participant, resulting in a word usage similarity score (416). The system can then identify, via the processor and based on the syntax similarity score and the word usage similarity score, the media as a fake (418).

In some configurations, the communication data can include, for each communication: a topic; identification of any slang used by the participant; a sentence structure used by the participant; and an identity of at least one other person communicating with the participant.

In some configurations, the plurality of communications can include tagged electronic transcripts, and wherein the natural language processing is executed on the tagged electronic transcripts. These tagged electronic transcripts can contain time stamps and/or other metadata about when or how the communication occurred, including the other parties associated with the communication.

In some configurations, the plurality of communications can include audio recordings, and the natural language processing can include executing a speech-to-text conversion in generating the communication data.

In some configurations, the statistical communication data of the participant can include: average words per minute by the participant for each communication in the plurality of communications; average duration of each communication in the plurality of communications; at least one of graphics or emojis used by the participant. In such configurations, the performing of the natural language processing can further include: identifying, via the processor for each communication in the plurality of communications, a communicator of the communication and at least one recipients of the recipient based on at least one of a voice profile of individuals participating in the communication or previously generated communication profiles of individuals participating in the communication, wherein the participant is either the communicator or a recipient within the at least one recipients; and the statistical analysis can further include calculating, via the processor, the average words for a unit of time of the participant for both when the participant is identified as a communicator and when the participant is identified as a recipient.

In some configurations, the method illustrated in FIG. 4 can be augmented to further include: transmitting, via the processor, the communication profile to a participant device of the participant; receiving, at the processor from the participant device, feedback associated with the communication profile; and modifying, via the processor, code executed by the processor regarding the generating of the communication profile based on the feedback. Modification of the code can include replacing (writing over) the code within the computer-readable medium with new code, or can include changing weights or aspects of the code such that it functions in a distinct manner than previous iterations.

In some configurations, the communication profile can identify quantitative behavior of the participant within the plurality of communications. In such configurations, the communication profile can be iteratively modified as new communications in which the participant is a participant are added to the database of stored communications.

Figure 5:
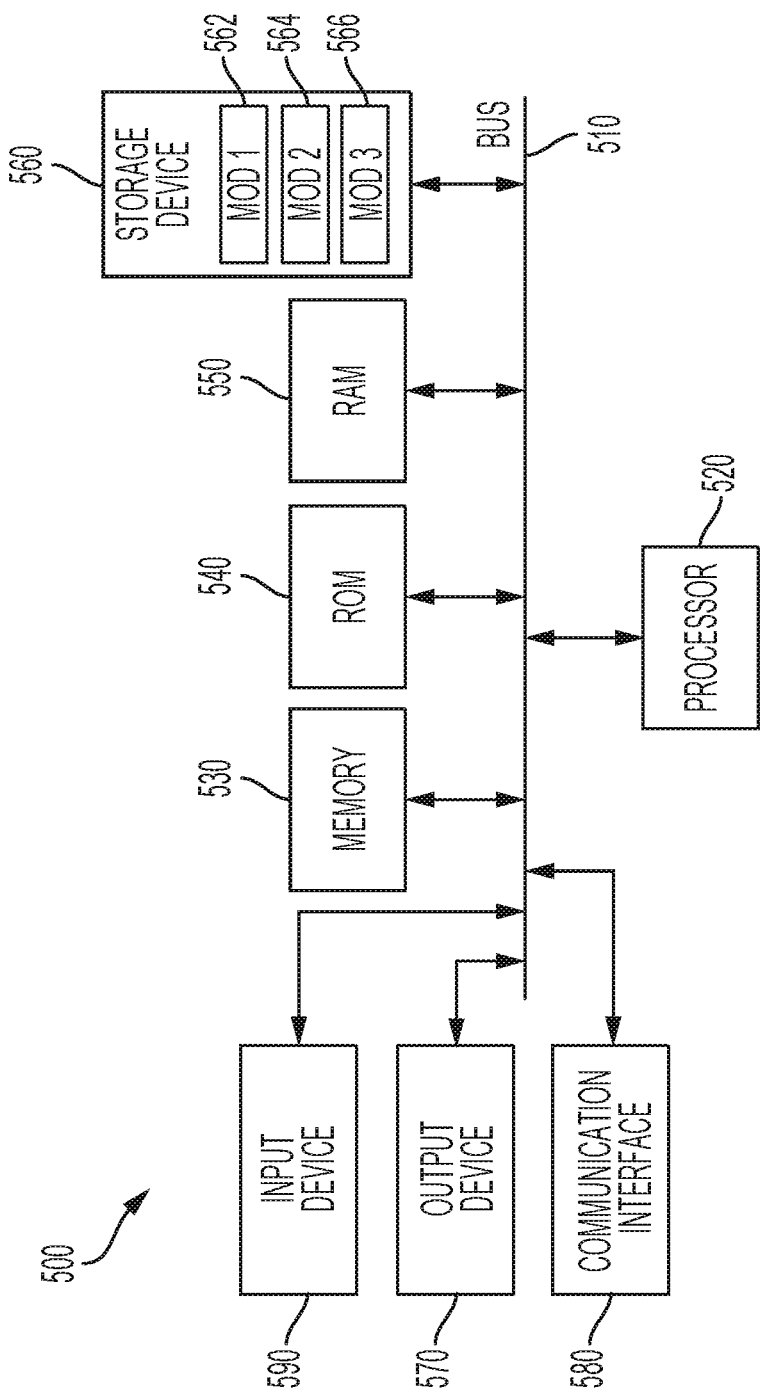
FIG. 5 illustrates an example computer system.

With reference to FIG. 5, an exemplary system includes a general-purpose computing device 500, including a processing unit (CPU or processor) 520 and a system bus 510 that couples various system components including the system memory 530 such as read-only memory (ROM) 540 and random access memory (RAM) 550 to the processor 520. The system 500 can include a cache of high-speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read-only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable participant interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a participant to provide multiple types of input to communicate with the computing device 500. The communications interface 580 generally governs and manages the participant input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method, comprising:
receiving, from a database of stored communications, a plurality of communications in which a user was one of multiple participants communicating;
performing, via a processor on each communication within the plurality of communications, natural language processing, the natural language processing resulting in communication data generated by the user;
executing, via the processor, a statistical analysis on the communication data, the statistical analysis comprising at least one regression, resulting in statistical communication data of the user;
generating, via the processor and using the statistical communication data of the user, a communication profile of the user, the communication profile comprising a data structure storing a user identifier associated with a personalized linguistic syntax of the user and the statistical communication data of the user;
receiving media containing audio purported to be from the user;
performing, via the processor, natural language processing on the audio purported to be from the user, resulting in analyzed purported audio;
comparing, via the processor, a syntax of the analyzed purported audio to the personalized linguistic syntax stored within the communication profile of the user, resulting in a syntax similarity score;
comparing, via the processor, words used within the analyzed purported audio with the statistical communication data of the user, resulting in a word usage similarity score; and
identifying, via the processor and based on the syntax similarity score and the word usage similarity score, the media as a fake.

2. The method of claim 1, the communication data comprising, for each communication of the plurality of communications:
a topic;
identification of any slang used by the user;
a sentence structure used by the user; and
an identity of at least one other person communicating with the user.

3. The method of claim 1, wherein the plurality of communications comprise tagged electronic transcripts, and wherein the natural language processing is executed on the tagged electronic transcripts.

4. The method of claim 3, wherein the tagged electronic transcripts contain time stamps.

5. The method of claim 1, wherein the plurality of communications comprise audio recordings, and
wherein the natural language processing executes a speech-to-text conversion in generating the communication data.

6. The method of claim 1, wherein the statistical communication data of the user comprises:
average words per minute by the user for each communication in the plurality of communications;
average duration of each communication in the plurality of communications; and
at least one of graphics or emojis used by the user.

7. The method of claim 6, wherein:
the performing of the natural language processing further comprises:
identifying, via the processor for each communication in the plurality of communications, at least one communicator of the communication and at least one recipient of the communication based on at least one of a voice profile of individuals participating in the communication or previously generated communication profiles of individuals participating in the communication, wherein the user is either a communicator of at least one communicator or a recipient of at least one recipient; and wherein execution of the statistical analysis further comprises:

calculating, via the processor, average words for a unit of time of the user for both when the user is identified as a communicator and when the user is identified as a recipient.

8. The method of claim 1, further comprising:
transmitting, via the processor, the communication profile to a user device of the user;
receiving, at the processor from the user device, feedback associated with the communication profile; and
modifying, via the processor, code executed by the processor regarding the generating of the communication profile based on the feedback.

9. The method of claim 1, wherein the communication profile identifies quantitative behavior of the user within the plurality of communications.

10. The method of claim 9, wherein the communication profile is iteratively modified as new communications in which the user is a participant are added to the database of stored communications.

11. A non-transitory computer-readable storage medium storing instructions that, when executed by one or more processors, cause operations comprising:
receiving, from a database, a plurality of communications in which a user participated;
performing natural language processing on the plurality of communications to obtain communication data associated with the user;
executing a statistical analysis on the communication data to obtain statistical communication data of the user;
generating, using the statistical communication data of the user, a communication profile of the user, the communication profile comprising a data structure storing a user identifier associated with a personalized linguistic syntax of the user and the statistical communication data of the user;
receiving media containing audio purported to be from the user;
performing natural language processing on audio purported to be from the user to obtain analyzed audio;
comparing a syntax of analyzed audio to the personalized linguistic syntax stored within the communication profile of the user to obtain a syntax similarity score;
comparing words used within analyzed audio with the statistical communication data of the user to obtain a word usage similarity score; and
identifying, based on the syntax similarity score and the word usage similarity score, the media as a fake.

12. The non-transitory computer-readable storage medium of claim 11, the communication data comprising, for each communication of the plurality of communications:
a topic;
identification of any slang used by the user;
a sentence structure used by the user; and
an identity of at least one other person communicating with the user.

13. The non-transitory computer-readable storage medium of claim 11, wherein the plurality of communications comprise tagged electronic transcripts, and wherein the natural language processing is executed on the tagged electronic transcripts.

14. The non-transitory computer-readable storage medium of claim 11, wherein the plurality of communications comprise audio recordings, and
wherein the natural language processing executes a speech-to-text conversion in generating the communication data.

15. The non-transitory computer-readable storage medium of claim 11, wherein the statistical communication data of the user comprises:
average words per minute by the user for each communication in the plurality of communications;
average duration of each communication in the plurality of communications; or
at least one of graphics or emojis used by the user.

16. The non-transitory computer-readable storage medium of claim 15, wherein:
the performing of the natural language processing further comprises:
identifying, for each communication in the plurality of communications, at least one communicator of the communication and at least one recipient of the communication based on at least one of a voice profile of individuals participating in the communication or previously generated communication profiles of individuals participating in the communication, wherein the user is either a communicator of at least one communicator or a recipient of at least one recipient; and
wherein execution of the statistical analysis further comprises:
calculating average words for a unit of time of the user for both when the user is identified as a communicator and when the user is identified as a recipient.

17. The non-transitory computer-readable storage medium of claim 11, the operations further comprising:
transmitting the communication profile to a user device of the user;
receiving, from the user device, feedback associated with the communication profile; and
modifying, based on the feedback, code regarding the generating of the communication profile.

18. The non-transitory computer-readable storage medium of claim 11, wherein the communication profile identifies quantitative behavior of the user within the plurality of communications.

19. The non-transitory computer-readable storage medium of claim 11, wherein the communication profile is iteratively modified as new communications in which the user is a participant are added to the database.

20. A system comprising:
one or more processors programmed with instructions that, when executed by the one or more processors, cause operations comprising:
receiving, from a database, a plurality of communications in which a user participated;
performing natural language processing on the plurality of communications to obtain communication data associated with the user;
executing a statistical analysis on the communication data to obtain statistical communication data of the user;
generating, using the statistical communication data of the user, a communication profile of the user, the communication profile comprising a data structure storing a user identifier associated with a personalized linguistic syntax of the user and the statistical communication data of the user;
receiving media containing audio purported to be from the user;
performing natural language processing on audio purported to be from the user to obtain analyzed audio;
comparing a syntax of analyzed audio to the personalized linguistic syntax stored within the communication profile of the user to obtain a syntax similarity score;
comparing words used within analyzed audio with the statistical communication data of the user to obtain a word usage similarity score; and
identifying, based on the syntax similarity score and the word usage similarity score, the media as a fake.

* * * * *